(12) United States Patent
Akiyama et al.

(10) Patent No.: US 8,700,554 B2
(45) Date of Patent: Apr. 15, 2014

(54) USING A DEGREE-OF-UNEXPECTEDNESS TO PROVIDE UNEXPECTED RECOMMENDATIONS

(75) Inventors: Takayuki Akiyama, Kokubunji (JP); Masaaki Tanizaki, Nishitokyo (JP); Kiyohiro Obara, Hachioji (JP)

(73) Assignee: Hitachi Solutions, Ltd., Tokyo (JP)

( * ) Notice: Subject to any disclaimer, the term of this patent is extended or adjusted under 35 U.S.C. 154(b) by 349 days.

(21) Appl. No.: 13/085,554

(22) Filed: Apr. 13, 2011

(65) Prior Publication Data
US 2011/0258155 A1    Oct. 20, 2011

(30) Foreign Application Priority Data
Apr. 20, 2010 (JP) .................................. 2010-097058

(51) Int. Cl.
*G06F 17/00* (2006.01)
*G06N 5/02* (2006.01)

(52) U.S. Cl.
USPC ............................................................ 706/50

(58) Field of Classification Search
USPC ............................................................ 706/50
See application file for complete search history.

(56) References Cited

U.S. PATENT DOCUMENTS

| | | | |
|---|---|---|---|
| 6,321,221 B1 * | 11/2001 | Bieganski | 705/26.7 |
| 2007/0078709 A1 * | 4/2007 | Rajaram | 705/14 |
| 2008/0120130 A1 * | 5/2008 | Hartmann et al. | 705/1 |
| 2008/0243817 A1 * | 10/2008 | Chan et al. | 707/5 |

FOREIGN PATENT DOCUMENTS

| | | |
|---|---|---|
| JP | 2008-117122 | 5/2008 |
| JP | 2009-230334 | 10/2009 |

OTHER PUBLICATIONS

Belloti, Victoria et al "Activity Based Serendipitous Recommendations with the Magitti Mobile Leisure Guide" Apr. 2008 [Online] Downloaded Jun. 5, 2013 http://delivery.acm.org/10.1145/1360000/1357237/p1157-bellotti.pdf?ip=151.207.250.21&acc=ACTIVE%20SERVICE&key=986B26D8D17D60C8AAC6AC1B60173C4E&CFID=222641840&CFTOKEN=46991694&_acm_=1370544703_2de036b.*

* cited by examiner

*Primary Examiner* — Ben Rifkin
(74) *Attorney, Agent, or Firm* — Antonelli, Terry, Stout & Kraus, LLP.

(57) ABSTRACT

In the situation where an amount of information on a user action history is small, information which is unexpected and interesting to a user cannot be presented with high accuracy. In order to solve this problem, a general degree of unexpectedness of an item, which does not depend on the user action history, and a degree of preference of the user to the item, which is based on the user action history, are calculated in an integrated manner, whereby the information which is unexpected and interesting to the user is recommended.

18 Claims, 10 Drawing Sheets

| User ID | Item ID | Time |
|---------|---------|----------|
| ID_U1   | ID_I1   | BB:BB:BB |
| ID_U1   | ID_I2   | CC:CC:CC |
| ID_U1   | ID_I3   | DD:DD:DD |
| ID_U1   | ID_I4   | EE:EE:EE |
| ...     | ...     | ...      |

FIG. 4A

| Item name | Item ID | Keyword |
|---|---|---|
| Item I1 | ID_I1 | KW_1, KW_3, KW_246,,,, |
| Item I2 | ID_I2 | KW_2, KW_56, KW_3406,,,, |
| Item I3 | ID_I3 | KW_3, KW_128, KW_476,,,, |
| Item I4 | ID_I4 | KW_4, KW_32, KW_5098,,,, |
| ... | ... | ... |

FIG. 4B

| Keyword | Frequency |
|---|---|
| KW_1 | w1 |
| KW_2 | w2 |
| KW_3 | w3 |
| KW_4 | w4 |
| ... | ... |

| Item | Degree of preference |
|---|---|
| ID_I1 | I1 |
| ID_I2 | I2 |
| ID_I3 | I3 |
| ID_I4 | I4 |
| ... | ... |

FIG. 4C

| Keyword | KW_1 | KW_2 | KW_3 | ... |
|---|---|---|---|---|
| KW_1 | 1 | U12 | U13 | ... |
| KW_2 | U12 | 1 | U23 | ... |
| KW_3 | U13 | U23 | 1 | ... |
| ... | ... | ... | ... | ... |

| User ID | Item ID | Time | Coordinates |
|---------|---------|----------|-------------|
| ID_U1 | ID_I1 | BB:BB:BB | P1 |
| ID_U1 | ID_I2 | CC:CC:CC | P2 |
| ID_U1 | ID_I3 | DD:DD:DD | P3 |
| ID_U1 | ID_I4 | EE:EE:EE | P4 |
| ... | ... | ... | ... |

FIG. 8A

| Store name | Store ID | Coordinates | Item |
|------------|----------|-------------|------|
| Store X1 | ID_X1 | PX1 | ID_I1, ID_I3, ID_I246,,,, |
| Store X2 | ID_X2 | PX2 | ID_I2, ID_I56, ID_I3406,,,, |
| Store X3 | ID_X3 | PX3 | ID_I3, ID_I128, ID_I476,,,, |
| Store X4 | ID_X4 | PX4 | ID_I4, ID_I32, ID_I5098,,,, |
| ... | ... | ... | ... |

FIG. 8B

| Store name | Store ID | Coordinates | Keyword |
|------------|----------|-------------|---------|
| Store X1 | ID_X1 | PX1 | KW_1, KW_3, KW_246,,,, |
| Store X2 | ID_X2 | PX2 | KW_2, KW_56, KW_3406,,,, |
| Store X3 | ID_X3 | PX3 | KW_3, KW_128, KW_476,,,, |
| Store X4 | ID_X4 | PX4 | KW_4, KW_32, KW_5098,,,, |
| ... | ... | ... | ... |

| Keyword | Degree of preference |
|---------|---------------------|
| KW_1    | w1                  |
| KW_2    | w2                  |
| KW_3    | w3                  |
| KW_4    | w4                  |
| ...     | ...                 |

FIG. 11B

| Item  | Degree of preference |
|-------|---------------------|
| ID_I1 | w1                  |
| ID_I2 | w2                  |
| ID_I3 | w3                  |
| ID_I4 | w4                  |
| ...   | ...                 |

USING A DEGREE-OF-UNEXPECTEDNESS TO PROVIDE UNEXPECTED RECOMMENDATIONS

CLAIM OF PRIORITY

The present application claims priority from Japanese patent application JP 2010-097058 filed on Apr. 20, 2010, the content of which is hereby incorporated by reference into this application.

BACKGROUND OF THE INVENTION

1. Field of the Invention

The present invention relates to an information presentation apparatus which recommends information matching with a user's preference to a user.

2. Background Art

In the modern society civilized in information, an amount of information which is provided by various media such as the Internet is immeasurable. Therefore, it is becoming difficult for a user to select information useful to the user from among an enormous amount of information. Under the circumstance, there is a technology of extracting preference information of a user (what kind of information interests the user) from an action history of the user, and recommending information suited to the preference of the user.

In such a recommendation technology, as a larger amount of the action history of the user such as an item purchase history is accumulated, the accuracy of extracting the preference of the user becomes higher, so that a more proper item can be recommended. On the other hand, a similar item may be always presented. Therefore, the recommendation result does not have freshness and unexpectedness to the user, and hence there is a possibility that the user gets bored with the recommendation system. In order to solve this problem, in recent years, a technology of imparting unexpectedness to a recommendation result has started to be developed.

According to JP 2008-117122A, from among recommendation results obtained by using an action history of another user having an interest similar to that of a target user, an item which is far from an interest ontology of the target user is recommended as an item with unexpectedness. According to JP 2009-230334A, an item having an item attribute different from an item attribute contained in an action history of a user is recommended as an item with unexpectedness. In addition, an item obtained by using a user model different from a user model generated by the action history of the user is recommended as an item with unexpectedness.

SUMMARY OF THE INVENTION

However, in order to recommend an item which will enable the user to feel unexpectedness, it is necessary to accumulate a variety of action histories of the user. According to the conventional method, an item is recommended on the basis of a single type of the action history (for example, a purchase history on the online shopping), and hence it is not possible to recommend the item which will enable the user to feel unexpectedness. For example, it is easy to imagine a situation in which an item which has never been purchased on the online shopping has been purchased in an actual store. In addition, there is a possibility that the item which will enable the user to feel unexpectedness is not necessarily represented only by the item which is far from the user action history as described in JP 2008-117122A and JP 2009-230334A.

The present invention has been made in view of the above-mentioned points, and therefore has an object to provide a method capable of recommending information which is unexpected and interesting to a user.

According to the present invention, a general degree of unexpectedness of an item, which does not depend on a user action history, and a degree of preference of the user to the item, which is based on the user action history, are calculated in an integrated manner, whereby information which is unexpected and interesting to the user is recommended.

The present invention provides an information presentation apparatus which presents an item to a user, including, as an example: a user action history database which accumulates a history of an item used by the user; an item database which accumulates a plurality of sets of an item and a keyword describing each item; a degree-of-preference calculation unit which uses the user action history database and the item database, to thereby calculate a degree to which the user is interested in each item, as a degree of preference; a degree-of-unexpectedness calculation unit which uses a reciprocal of a degree of co-occurrence between keywords accumulated in the item database, to thereby calculate a degree of unexpectedness of each item; an integrated processing unit which processes in an integrated manner the degree of preference and the degree of unexpectedness, to thereby calculate a recommendation score of each item accumulated in the item database; a presentation information decision unit which uses the recommendation score calculated by the integrated processing unit, to thereby decide information of an item to be presented; and an information communication unit which performs information communication with a terminal, in which the information of the item decided by the presentation information decision unit is transmitted from the information communication unit to the terminal.

The degree-of-preference calculation unit may use the user action history database, to thereby calculate the degree of preference of each item on a basis of a degree of similarity to the used item. In addition, the degree-of-preference calculation unit may use a user action history database of a user other than the user, to thereby calculate the degree of preference.

The integrated processing unit may include a function of adjusting a parameter for combining the degree of preference and the degree of unexpectedness with each other, and may learn and adjust a parameter for combining the degree of preference and the degree of unexpectedness with each other, on a basis of a ratio of the degree of preference and the degree of unexpectedness of an item which is selected by the user on the terminal.

In addition, the information presentation apparatus according to the present invention may further include: a store database which registers therein a store at which an item can be used; and a degree-of-utilization calculation unit which uses the store database and position information of the terminal received from the terminal, to thereby calculate a degree of utilization of each item. In addition, the information presentation apparatus according to the present invention may further include a data update unit which updates data of the item database.

According to features of the present invention, it is possible to recommend information which is unexpected and interesting to a user and to promote continuous utilization of a recommendation system without boring the user.

DETAILED DESCRIPTION OF THE PREFERRED EMBODIMENTS

Hereinafter, embodiments of the present invention are described with reference to the drawings.

[Embodiment 1]

Figure 1:
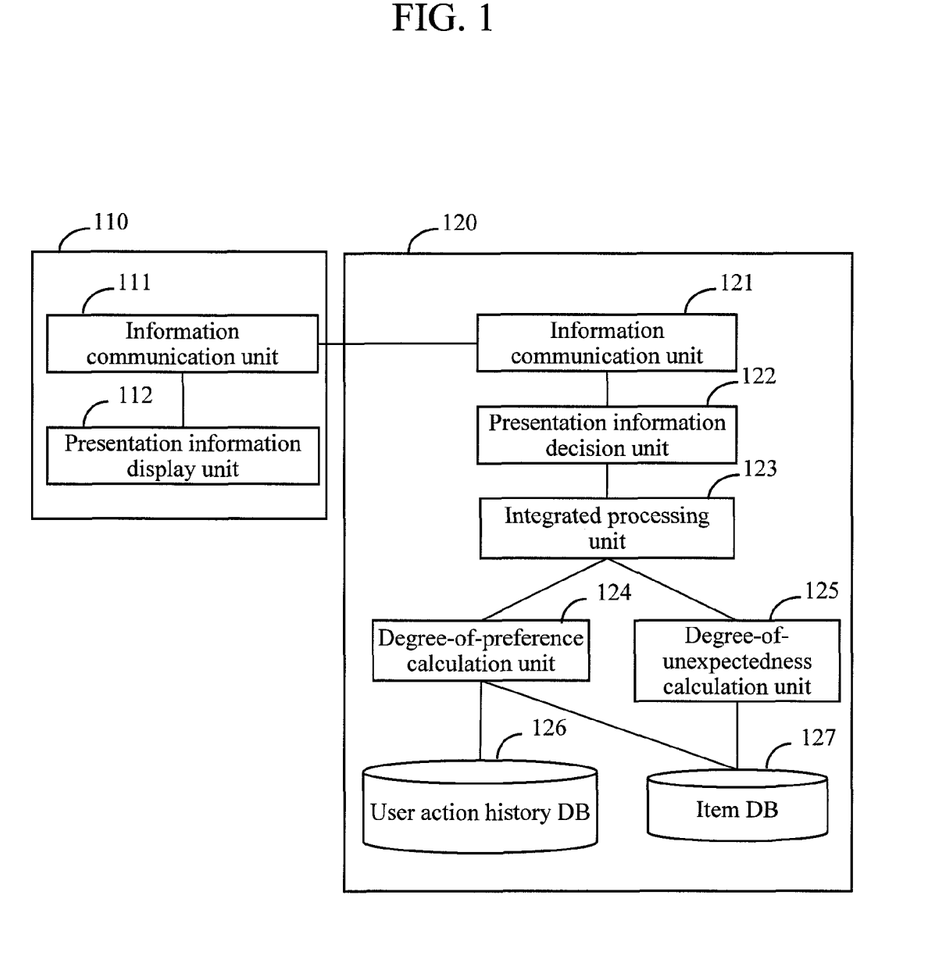
FIG. 1 is a system configuration diagram illustrating one embodiment of an information presentation system according to the present invention.

FIG. 1 is a system configuration diagram illustrating one embodiment of an information presentation system according to the present invention. A terminal 110 includes an information communication unit 111 and a presentation information display unit 112. A server 120 includes an information communication unit 121, a presentation information decision unit 122, an integrated processing unit 123, a degree-of-preference calculation unit 124, a degree-of-unexpectedness calculation unit 125, a user action history database 126, and an item database 127. The user action history database 126 and the item database 127 may be managed by the terminal with the use of, for example, an embedded database. It should be noted that, herein, for simplicity, description is given assuming that the number of users is one. Alternatively, a plurality of sets of the user action history database 126 and the item database 127 corresponding to individual users are held in the server 120, and the respective sets of the user action history database 126 and the item database 127 are managed in association with the terminal 110 for each user. In this way, the present invention can be easily extended to an information presentation system which presents information individually to a plurality of users.

The terminal 110 is a terminal having a communication function and an information display function, and a portable terminal such as a portable phone and an information retrieval terminal such as a PC can be applied to the terminal 110. The information communication unit 111 exchanges information with the server 120. The communication method may be a general communication method with the intermediation of the network, or may be an ad hoc method using infrared rays or the like. The presentation information display unit 112 is a screen which displays information, such as a display, and displays presentation information which is decided by the server 120 and is transmitted to the terminal 110.

The server 120 is, for example, an arithmetic processing unit such as a PC connected to the network, and may be another electronic device having a function as the server. The information communication unit 121 exchanges information with the terminal 110. The presentation information decision unit 122 uses a recommendation score of each item calculated by the integrated processing unit 123, to thereby decide a recommendation list of items to be presented to the user. The integrated processing unit 123 uses a degree of preference of each item calculated by the degree-of-preference calculation unit 124 and a degree of unexpectedness of each item calculated by the degree-of-unexpectedness calculation unit 125, to thereby calculate the recommendation score of each item.

Figure 3:
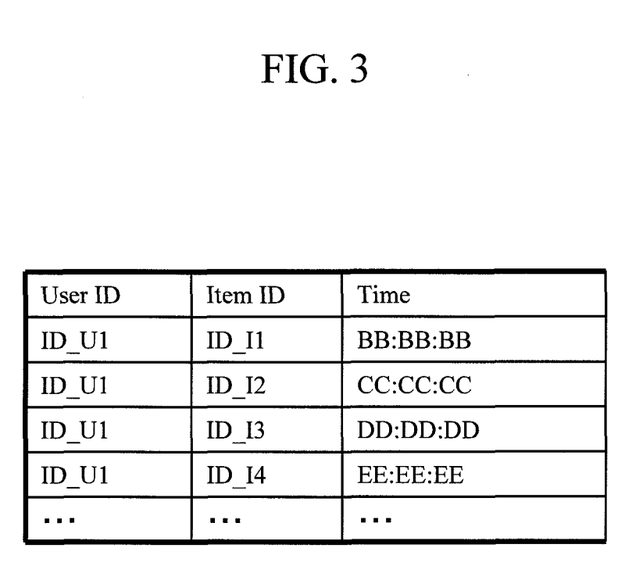
FIG. 3 is a diagram for describing an example of a user action history database.

The user action history database 126 manages an action of the user and the time at which the action is performed. FIG. 3 illustrates a configuration example of the user action history database 126. The user action history database 126 includes categories of a user ID, an item ID, and time. The item ID is an ID which is imparted to an item managed by the item database 127. The user action history database is generated by, for example, an operation history in a portable terminal of the user or trajectory information using a positioning device such as a GPS. In addition, the user action history database may be generated through an input by the user himself/herself.

Figure 4A:
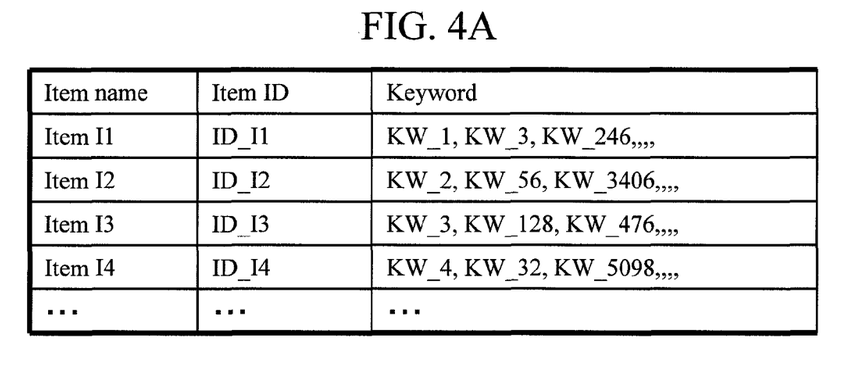
FIGS. 4A to 4C are diagrams for describing an example of an item database.

FIG. 4A illustrates a configuration example of the item database 127. The item database 127 includes categories of an item name, an item ID, and a keyword. The action in this example refers to actions of having a meal and watching something, and in that case, the items managed by the item database correspond to a cooking menu, video contents such as a watched TV program and a DVD, and the like. Any hint which can describe an item may be defined as the keyword, and examples of the hints include a word describing the item and a database registration date of the item. These hints may be obtained by distribution from a metadata creation company, or may be automatically generated on the basis of information on the Internet. Other examples of the action include sightseeing, document retrieval of an essay or a patent, information retrieval via the Internet, and failure handling. In that case, the items managed by the item database may be set to a sightseeing spot name, a document title, a web address, a failure handing manual, and the like.

Figure 2:
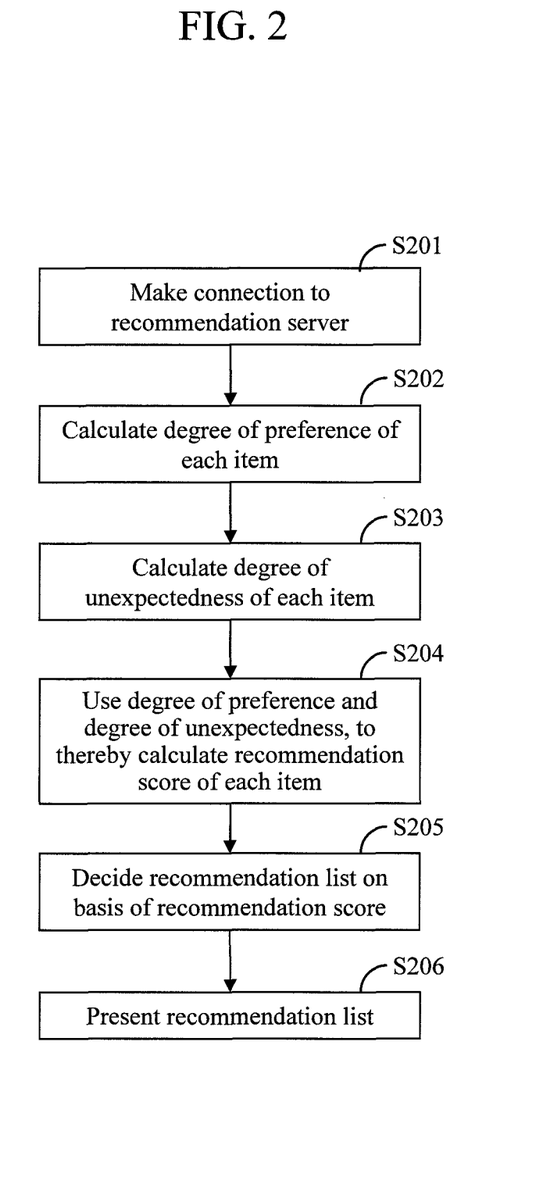
FIG. 2 is a chart for describing a processing flow of item recommendation.

FIG. 2 is a chart showing a flow from an action analysis to an interest scene presentation according to the present embodiment.

In Step 201, an operation through the user terminal 110 is inputted, and a connection is made to the recommendation server 120. For example, this operation may be performed by pressing a button such as a "recommendation" button, which is provided to a portable phone, or may be inputted as a service on the web by accessing a predetermined web address. In Step 202, the degree-of-preference calculation unit 124 of the server 120 uses the user action history database 126 and the item database 127, to thereby calculate the degree of preference of each item as expressed in Equation (1).

$$I_S = \sum_i^N w_i C_i \quad (1)$$

Figure 4B:
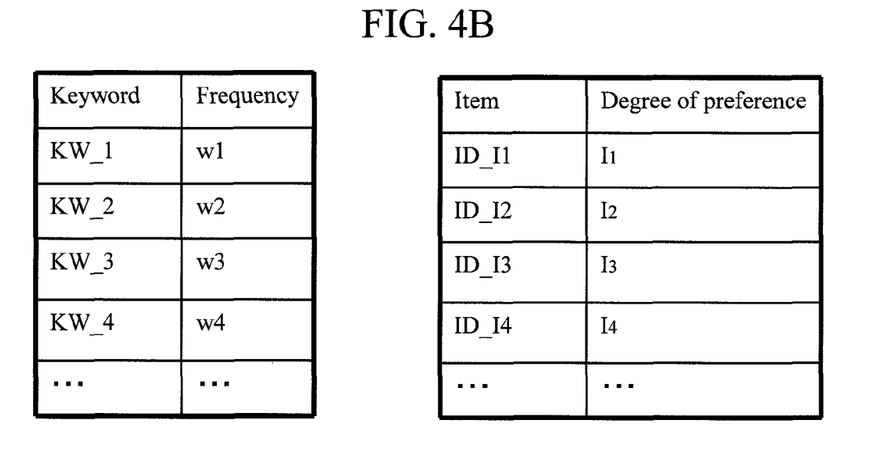

In this equation, $I_s$ represents the degree of preference of an item S. i represents the keyword, and N represents the total count of the keyword. $w_i$ represents the probability of the keyword i, and is calculated by an appearance frequency of the keyword i associated with the item ID contained in each history of the user action history database. At this time, with the use of the time registered in the user action history database, an appearance frequency in actions close to the present may be calculated. $C_i$ shows whether or not the keyword i exists in the item S, and may return a binary value of "0" or "1". For the degree of preference, with the use of the degree of similarity between items, the degree of similarity to the used item may be calculated as the degree of preference. For example, the degree of similarity to the used item is calculated by a generally used degree of similarity, for example, the number of the identical keyword. The calculation result of the probability of a keyword or the degree of preference of an item may be stored as illustrated in FIG. 4B.

In Step 203, the degree-of-unexpectedness calculation unit 125 of the server 120 uses the item database 127, to thereby calculate the degree of unexpectedness of each item as expressed in Equation (2) on the basis of the reciprocal of the sum of the degree of co-occurrence between keywords included in the item.

$$Q_S = \left(\frac{1}{|S|} \sum_{v,w \in S} U_{vw}\right)^{-1} \quad (2)$$

$$U_{vw} = \frac{N_{vw}}{N_v + N_w - N_{vw}} \quad (3)$$

Figure 4C:
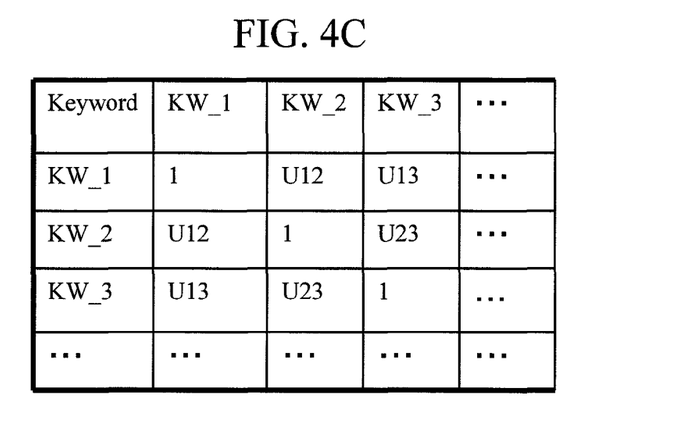

In these equations, $Q_s$ represents the degree of unexpectedness of the item S. $|S|$ represents the number of keywords included in the item S, and is a normalization coefficient of the degree of unexpectedness. v and w each represent a keyword, and $U_{vw}$ represents the degree of likelihood that the keyword v and the keyword w are included at the same time as the keywords of the item in the item database illustrated in FIG. 4A, and is calculated as expressed in Equation (3). $N_v$ represents the total count of items including the keyword v, and $N_{vw}$ represents the total count of items including the keyword v and the keyword w at the same time. $U_{vw}$ may be used for calculating the degree of co-occurrence between keywords. At this time, with the use of the degree of preference calculated in Step 202, a keyword having an appearance frequency equal to or lower than a given threshold value, which is regarded as not to relate to the preference of the user, avoids being used for the calculation, whereby the processing may be speeded up. The threshold value may be set in advance by a service provider, or may be automatically calculated by using an appearance frequency similar to that of a general keyword. Further, the calculation result of the degree of co-occurrence between keywords may be stored as illustrated in FIG. 4C. In addition, the degree of unexpectedness of an item does not depend on the action history, and hence the calculation result thereof may be registered for the item in advance, for example, at the time of item registration.

In Step 204, the integrated processing unit 123 of the server 120 uses the degree of preference and the degree of unexpectedness respectively calculated in Step 202 and Step 203, to thereby calculate the recommendation score of each item as expressed in Equation (4).

$$P_S = \alpha \times I_S + (1-\alpha) \times Q_S \quad (4)$$

In this equation, $P_s$ represents the recommendation score of the item S. $\alpha$ represents a parameter, takes a value between 0 and 1, and is used for controlling the degree as to which of the degree of preference and the degree of unexpectedness is more prioritized in the recommendation result. This value may be set to a given value by a system designer or a service company, may be manually set by the user, or may change while learning an optimal value in response to an input by the user. A conceivable example of the calculation method for learning includes a method in which: if an item which is selected by the user from the presented recommendation list has a degree of preference higher than the degree of unexpectedness, $\alpha$ is multiplied by 1.1; and inversely, if an item having a degree of unexpectedness higher than the degree of preference is selected, $\alpha$ is multiplied by 0.9. The calculation method for learning is not limited thereto, and any method can be adopted as long as feedback of user's evaluation can be performed. It is assumed that item selection by the user is performed on the terminal, and whether or not the corresponding item is selected may be determined on the server side by, for example, transmitting information of a button click or the like to the server.

In Step 205, the presentation information decision unit 122 of the server 120 decides several items having a higher recommendation score calculated as expressed in Equation (4), as items to be presented on the recommendation list. The number of items to be presented may be set by a service company. In addition, the number of items to be presented is individually set for a medium which displays the retrieval result. For example, setting is made so that the number of items to be displayed is different between the case of displaying on a PC and the case of displaying on a screen of a portable phone. In addition, settings of a display method are changed depending on the type of a medium. For example, in the case where item information contains a moving picture or metadata in the text format, if the display medium is a medium having a sufficient processing speed, such as a PC, entire information is displayed. On the other hand, in the case where the display medium is a medium such as a portable phone, if the entire information is displayed, a problem that the processing slows down arises, and hence only text data or a summarized image of the moving picture is displayed. In this manner, the display method is appropriately decided so as to suit the type of a medium (the display method may be set in advance in accordance with a medium used for displaying, or may be automatically decided on the basis of the size of a display screen of the medium). In addition, in consideration of freshness of items, with regard to items having the same recommendation score, an item whose registration date is later may be displayed in a higher rank.

In Step 206, the information communication unit 121 of the server 120 transmits the item information contained in the decided recommendation list to the terminal 110. In the terminal 110, the information communication unit 111 receives the data transmitted from the server, and the recommendation list is displayed on the presentation information display unit 112.

For example, in the case where the item is defined as a cooking menu, a menu name, a menu ID, amounts of cooking ingredients, salt, and the like of the menu, and the like are registered in the item database. A menu name that the user eats and the time at which the menu is eaten are stored in the user action history database. When the user is thinking about a dinner menu, the user makes a connection to the recommendation server, and requests the recommendation list. As a result, the user can receive, as the recommendation result, an unexpected menu which is different from a menu recently eaten and cannot be thought up by his/her own preference. For example, a person who frequently eats strawberries being fruit but does not often eat Japanese confectionery can receive, as the recommendation result, a Japanese confection called "Ichigo Daifuku", which is a rice cake stuffed with sweet filling and a strawberry.

In addition, in the case where the item is defined as video contents such as a DVD, detailed information describing the video contents, such as a title, production date and time, a genre, and casts, is stored in the item database. The time at which the user watches the video contents is stored in the user action history database which is generated by using a watching history accumulated in a watching terminal. The user makes a connection to the recommendation server, and requests the recommendation list. As a result, the user can receive, as the recommendation result, unexpected video contents which are different from video contents recently watched and cannot be thought up by his/her own preference. For example, the user can receive, as the recommendation result, an educational program on which a comedian that the user often watches on a daily basis appears.

In addition, in the case where the item is defined as an academic essay, detailed information describing this essay, such as an essay title, posting date and time, a technical field, an author, and a technical keyword, is stored in the item database. The time at which the user consults the essay is stored in the user action history database which is generated by using a consultation history of a pdf file accumulated in a PC. The user makes a connection to the recommendation server, and requests the recommendation list. As a result, the user can receive, as the recommendation result, an unexpected essay which is different from an essay recently consulted and cannot be thought up by his/her own preference to be missed out. For example, it is possible to recommend, to a person who often consults an essay in the medical field, an essay in the mathematical field which has contents technically close thereto but is generally regarded as not to be similar thereto.

The presented recommendation list may be presented to a user other than the target user via the network such as the Internet. In addition, the presented recommendation list may be recorded on an external storage medium such as a USB memory to be sharable with another user. At this time, only an item ID and the summary of the item may be shared.

In the case where the results of calculating the appearance frequency of a keyword and the degree of co-occurrence between keywords, which are used for calculating the degree of preference and the degree of unexpectedness, are stored as illustrated in FIGS. 4B and 4C, the integrated processing unit 123 of the server extracts a keyword necessary to calculate the recommendation score, whereby the processing is speeded up. A threshold value of the degree of preference is provided, and a keyword having a value equal to or smaller than the threshold value is deleted as a keyword which does not interest the user. The threshold value may be set in advance by a service provider, or may be automatically calculated by using an appearance frequency similar to that of a general keyword. Then, in the calculation of the degree of unexpectedness, only the degree of co-occurrence between the extracted keywords may be calculated to be stored. In addition, inversely, a threshold value is set to the degree of co-occurrence, and a combination of keywords having a value equal to or larger than the given threshold value is regarded as keywords having the same meaning, so that the keywords may be stored in the database with the number of the keywords being compressed. In that case, a dictionary of a combination of words having the same meaning may be generated.

In the present embodiment, all items used by the user are to be registered, and a function of automatically deleting the items used by the user after a lapse of a given period of time may be added. In this case, the period of time until the deletion may be set in advance, or may be set by the user himself/herself.

Hereinafter, description is given of the case where the above-mentioned embodiment is extended.

[Embodiment 2]

Figure 5:
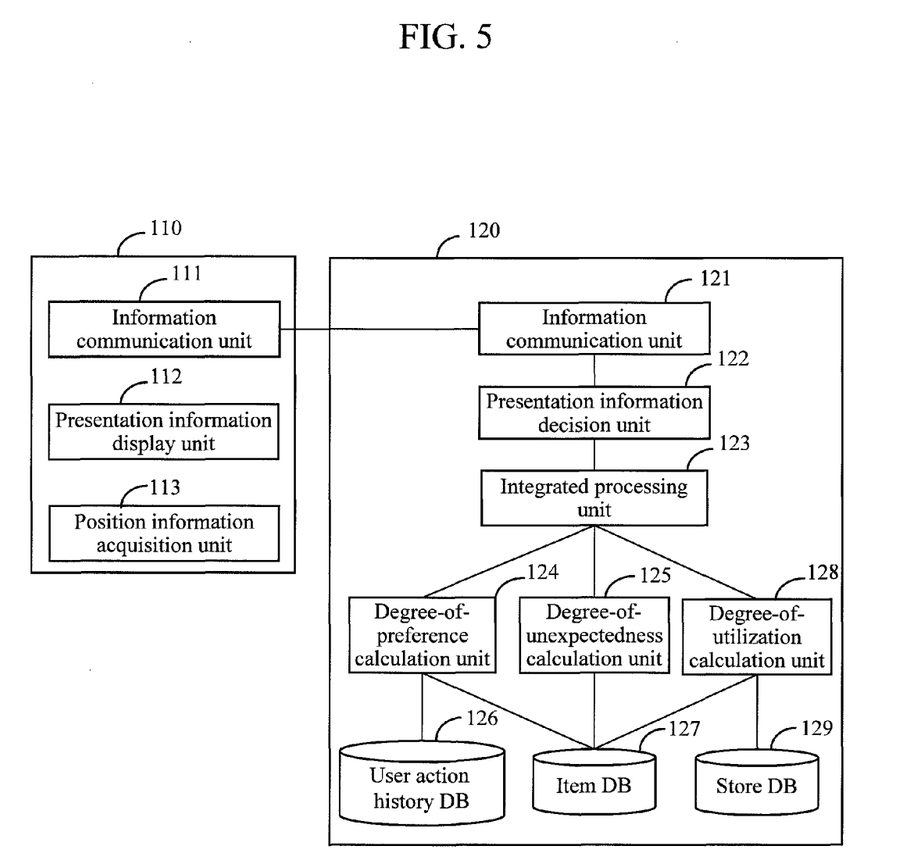
FIG. 5 is a system configuration diagram illustrating another embodiment of the information presentation system according to the present invention.

FIG. 5 is a diagram illustrating a configuration example of an information presentation system in which, in addition to the configuration of the information presentation system described in Embodiment 1, the terminal 110 includes a position information acquisition unit 113, and the server 120 includes a degree-of-utilization calculation unit 128 and a store database 129.

The integrated processing unit 123 processes in an integrated manner the degree of preference calculated by the degree-of-preference calculation unit 124, the degree of unexpectedness calculated by the degree-of-unexpectedness calculation unit 125, and a degree of utilization calculated by the degree-of-utilization calculation unit 128, to thereby calculate the recommendation score of each item. In the present embodiment, a mobile terminal having a GPS function, such as a portable phone, is assumed as the terminal 110.

Figure 7:
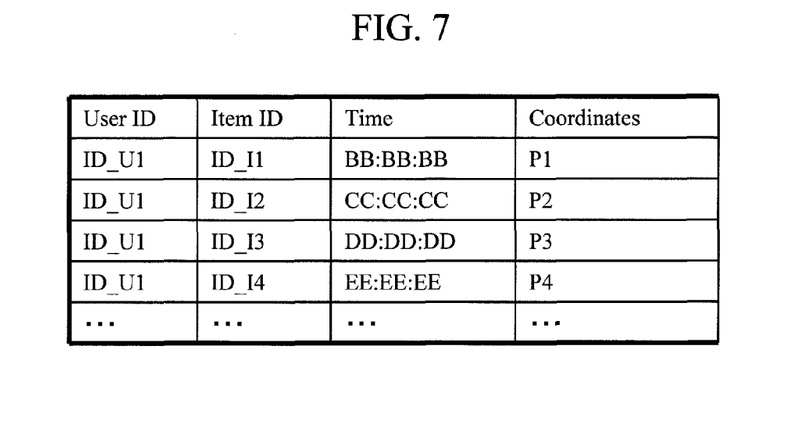
FIG. 7 is a diagram for describing another example of the user action history database.

The user action history database 126 manages an action of the user, the time at which the action is performed, and information of a position at which the action is performed. FIG. 7 illustrates a configuration example of the user action history database. The user action history database includes categories of a user ID, an item ID, time, and coordinates. The time and the coordinates are used in the calculation of the degree of preference in the case of taking time and a place into consideration. For example, the time and the coordinates are used in the case where the place has locality.

Figure 8A:
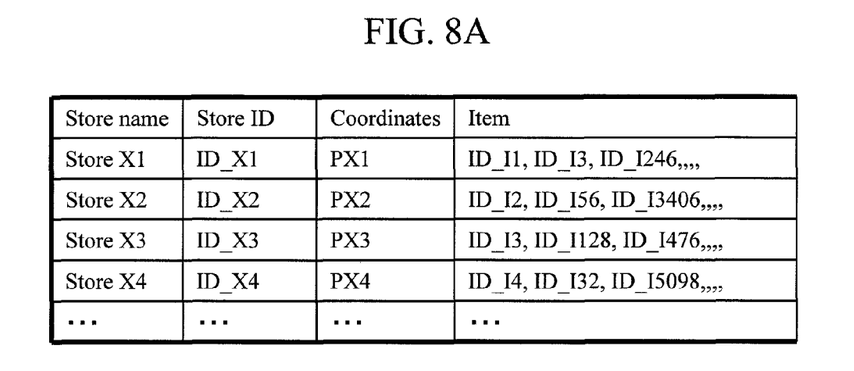
FIGS. 8A and 8B are diagrams for describing an example of a store database.
Figure 8B:
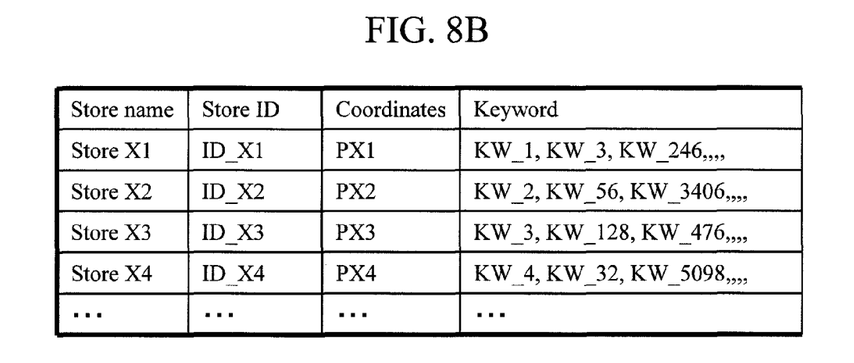

The store database 129 manages a store, goods treated in the store, a service, and position information of the store. FIGS. 8A and 8B each illustrate a configuration example of the store database. As illustrated in FIG. 8A, an ID of an item treated in the store may be registered in the store database, and as illustrated in FIG. 8B, a keyword describing the item may be registered therein. In addition, both of the item and the keyword may be registered therein.

The other system configuration is the same as the configuration of Embodiment 1 illustrated in FIG. 1.

Figure 6:
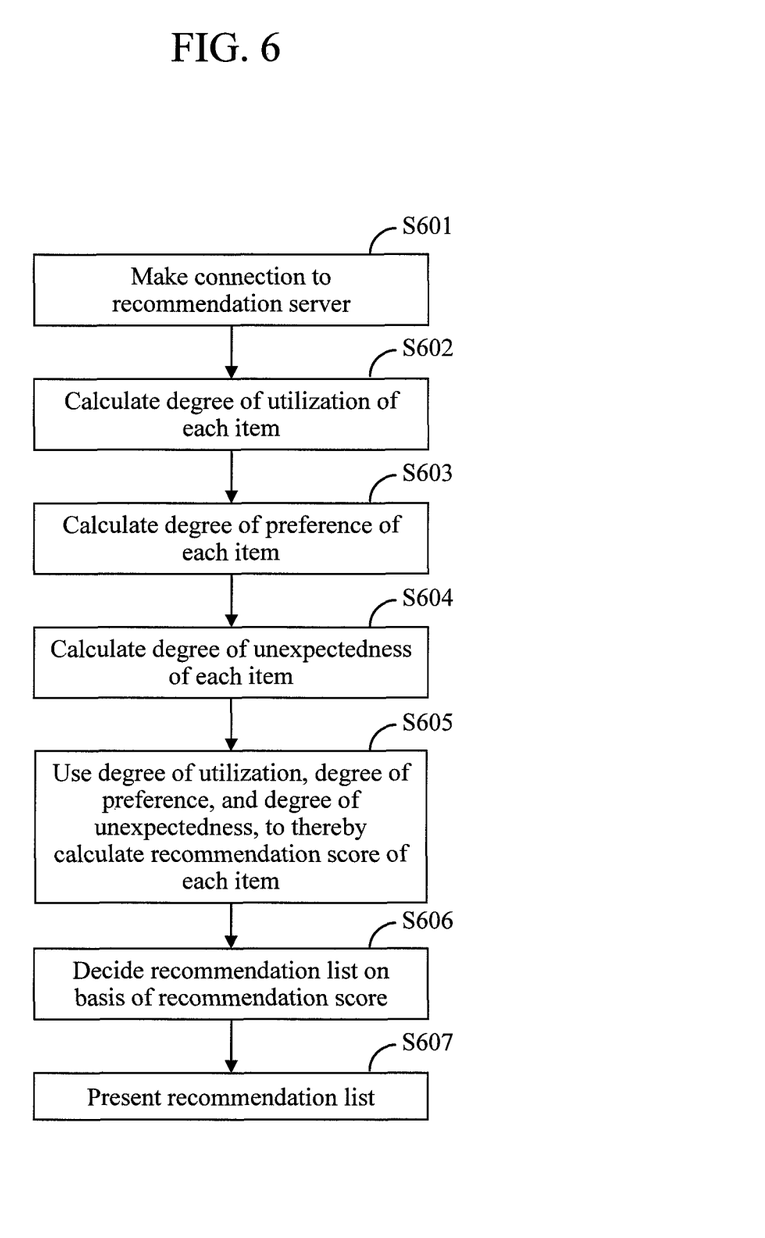
FIG. 6 is a chart for describing the processing flow of the item recommendation.

A flow of recommendation processing is shown in FIG. 6. Similarly to Embodiment 1, in Step 601, an operation through the terminal 110 is inputted, and a connection is made to the recommendation server 120. The information communication unit 111 of the terminal 110 transmits, to the server 120, coordinates of the current position of the user which are acquired by the position information acquisition unit 113.

In Step 602, the degree-of-utilization calculation unit 128 of the server 120 uses the item database 127 and the store database 129, to thereby calculate the degree of utilization of each item. The degree of utilization is defined by, for example, a distance from the current position to a store at which the item can be used as expressed in Equation (5).

$$D_S = P_X - P_C \quad (5)$$

In this equation, $D_s$ represents a distance to the nearest store at which the item S can be used, and corresponds to the degree of utilization. $P_X$ represents coordinates of the nearest store at which the item S can be used, and $P_C$ represents coordinates of the current position. The degree of utilization may be defined by a result obtained by using a map employed in a car navigation system to thereby calculate a travel time from the current position to the store. In the case where FIG. 8B is applied to the store database, Equation (5) expresses not the item but the nearest store at which the keyword can be used, so that the degree of utilization to the keyword is calculated. Further, with the use of the time and the coordinates registered in the action history database, whether or not the user goes to the place on a daily basis may be additionally considered. In both of the case of using the store database of FIG. 8A and the case of using the store database of FIG. 8B, the method of calculating the degree of utilization is the same.

In the calculation of the degree of preference of each item in Step 603 and in the calculation of the degree of unexpectedness of each item in Step 604, the same calculations as those in Step 202 and Step 203 of Embodiment 1 are performed. In these steps, on the basis of the degree of utilization calculated in Step 602, the degree of preference and the degree of unexpectedness are not calculated for an item having the degree of utilization equal to or smaller than a given threshold value, whereby the processing may be speeded up.

Next, in Step 605, the degree of utilization, the degree of preference, and the degree of unexpectedness, which are respectively calculated in Step 602, Step 603, and Step 604, are processed in an integrated manner, whereby the recommendation score of each item is calculated as expressed in Equation (6).

$$P_S = \alpha \times I_S + \beta \times Q_S + (1-\alpha-\beta) \times D_S \quad (6)$$

In this equation, $P_s$ represents the recommendation score of the item S. $\alpha$ and $\beta$ each represent a parameter, and take a value between 0 and 1, and $\alpha+\beta \leq 1$. These parameters are used for controlling the degree as to which of the degree of utilization, the degree of preference, and the degree of unexpectedness is more prioritized in the recommendation result. These values may be set to a given value by a system designer or a service company, may be manually set by the user, or may change while learning an optimal value in response to an input by the user. An example of the calculation method for learning includes a method in which: if an item which is selected by the user from the presented recommendation list has a higher degree of preference, $\alpha$ is multiplied by 1.1; if an item having a higher degree of unexpectedness is selected, $\beta$ is multiplied by 1.1; and if the degree of utilization is more prioritized, $\alpha$ and $\beta$ are each multiplied by 0.9. The calculation method for learning is not limited thereto, and any method can be adopted as long as feedback of user's evaluation can be performed.

The integrated processing unit 123 estimates a usual action area of the user on the basis of a history of the position information of the user in the user action history database 126, and then registers the calculation result of the degree of utilization within a specific area, whereby a load of the processing may be reduced.

After that, similarly to Embodiment 1, in Step 606, the presentation information decision unit 122 of the server decides the recommendation list. Then, in Step 607, the recommendation list is transmitted from the server 120 to the terminal 110 to be displayed on the presentation information display unit 112 of the terminal 110.

For example, in the case where the item is defined as a cooking menu, a menu name, a menu ID, amounts of cooking ingredients, salt, and the like of the menu, and the like are registered in the item database. A menu name of a menu that the user eats and the time at which the menu is eaten are stored in the user action history database. These may be inputted by the user himself/herself. Coordinates of a supermarket and the like, treated cooking ingredients, treated goods, and the like are registered in the store database. In addition, components contained in cooking ingredients may be registered as keywords. When the user is thinking about a dinner menu, the user makes a connection to the recommendation server, and requests the recommendation list. As a result, on the basis of cooking ingredients and the like which can be purchased from the current position, the user can receive, as the recommendation result, an unexpected and realizable menu which is different from a menu recently eaten and cannot be thought up by his/her own preference. In the case where FIG. 8A is applied to the store database, the recommendation server calculates the degree of preference and the degree of unexpectedness for each menu, and outputs, as the recommendation result, a menu having a higher recommendation score among menus which have been cooked before in a supermarket or a restaurant. In the case where FIG. 8B is applied to the store database, a menu having a higher recommendation score and cooking ingredients necessary to cook the menu are outputted. For example, the user can purchase cooking ingredients which cannot be purchased in a usual supermarket, by going a little farther than usual, and can receive, as the recommendation result, a menu which is seldom cooked and matches with his/her own preference.

In addition, in the case where the item is defined as video contents such as a DVD, detailed information describing the video contents, such as a title, production date and time, a genre, and casts, is stored in the item database. An ID of the video contents that the user watches and the time at which the user watches the video contents are stored in the user action history database. The registration into the user action history database may be performed through an input by the user himself/herself, or may be performed by extracting from a terminal operation history of a watching terminal, a portable terminal, and the like. Coordinates of a rental shop and the like, treated contents, and the like are registered in the store database. The user makes a connection to the recommendation server, and requests the recommendation list. As a result, on the basis of information of a store accessible from the current position, the user can receive, as the recommendation result, unexpected and realizable video contents which are different from video contents recently watched and cannot be thought up by his/her own preference. For example, the user can receive, as the recommendation result, video contents which can be rented, by going a little farther than usual, from a rental shop which is a little far from a usual rental shop, are seldom watched, and match with his/her own preference. This can be applied to not only the video contents but also books, music CDs, and the like, and those contents may be comprehensively treated.

[Embodiment 3]

Figure 9:
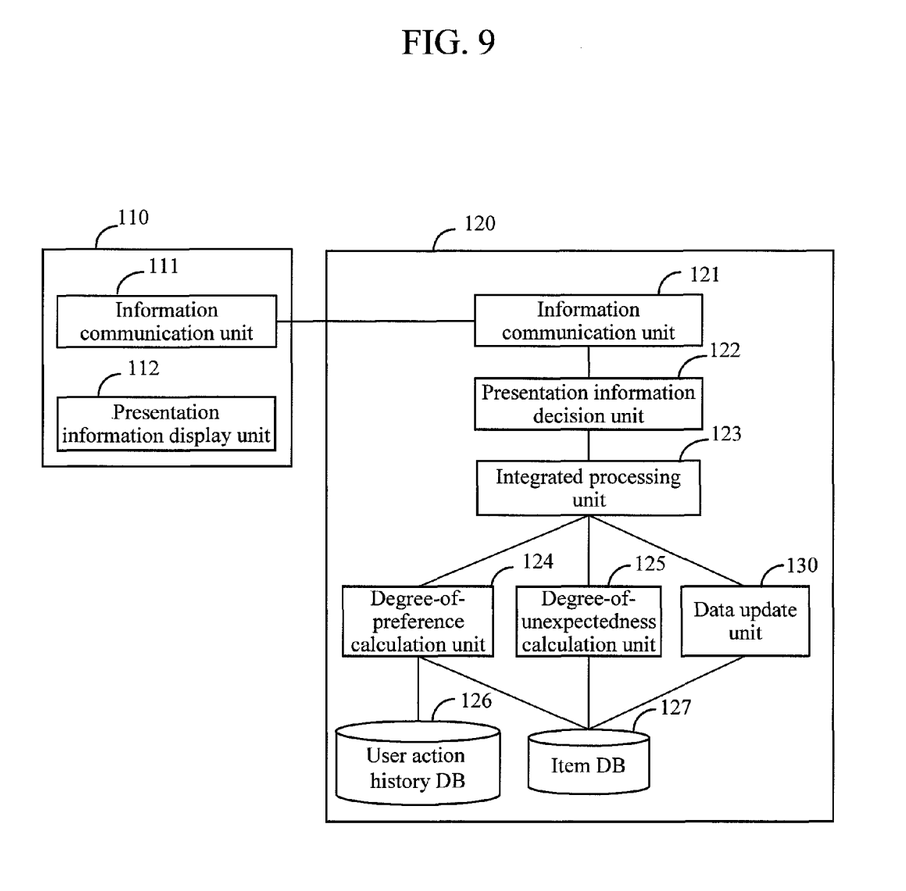
FIG. 9 is a system configuration diagram illustrating still another embodiment of the information presentation system according to the present invention.

FIG. 9 is a diagram illustrating a configuration example of an information presentation system in which, in addition to the configuration of the information presentation system described in Embodiment 1, the server includes a data update unit 130. The data update unit 130 performs a process of updating the item database. The other configuration is the same as the configuration of Embodiment 1 illustrated in FIG. 1.

The data update unit 130 adds new item information to the item database 127. The item information may be obtained by distribution from a service company or a metadata creator, or may be information on the Internet. The data format may be a free format, or may be a format as illustrated in FIG. 4A.

The data update unit 130 uses a keyword extraction algorithm such as morphological analysis, to thereby analyze the item information, and extracts an item name and a keyword from the item information. All groups of the keywords generated at this time may be registered in the item database. However, from a practical point of view, there is a limit on a disk capacity and a memory region. Therefore, it is preferable that the number of keywords be reduced by the integrated processing unit 123, and only keywords which are important for recommendation in view of the degree of preference and the degree of unexpectedness be registered. The degree of importance of each keyword is calculated as expressed in, for example, Equation (7).

$$E_v = I_v + \sum_{w}^{N} U_{vw} \tag{7}$$

In this equation, $E_v$ represents the degree of importance of the keyword v. $I_v$ represents the degree of preference of the keyword v, and is stored as illustrated in, for example, FIG. 4B. $U_{vw}$ represents the degree of unexpectedness about the co-occurrence between the keyword v and the keyword w, and is stored as illustrated in, for example, FIG. 4C.

[Embodiment 4]

Figure 10:
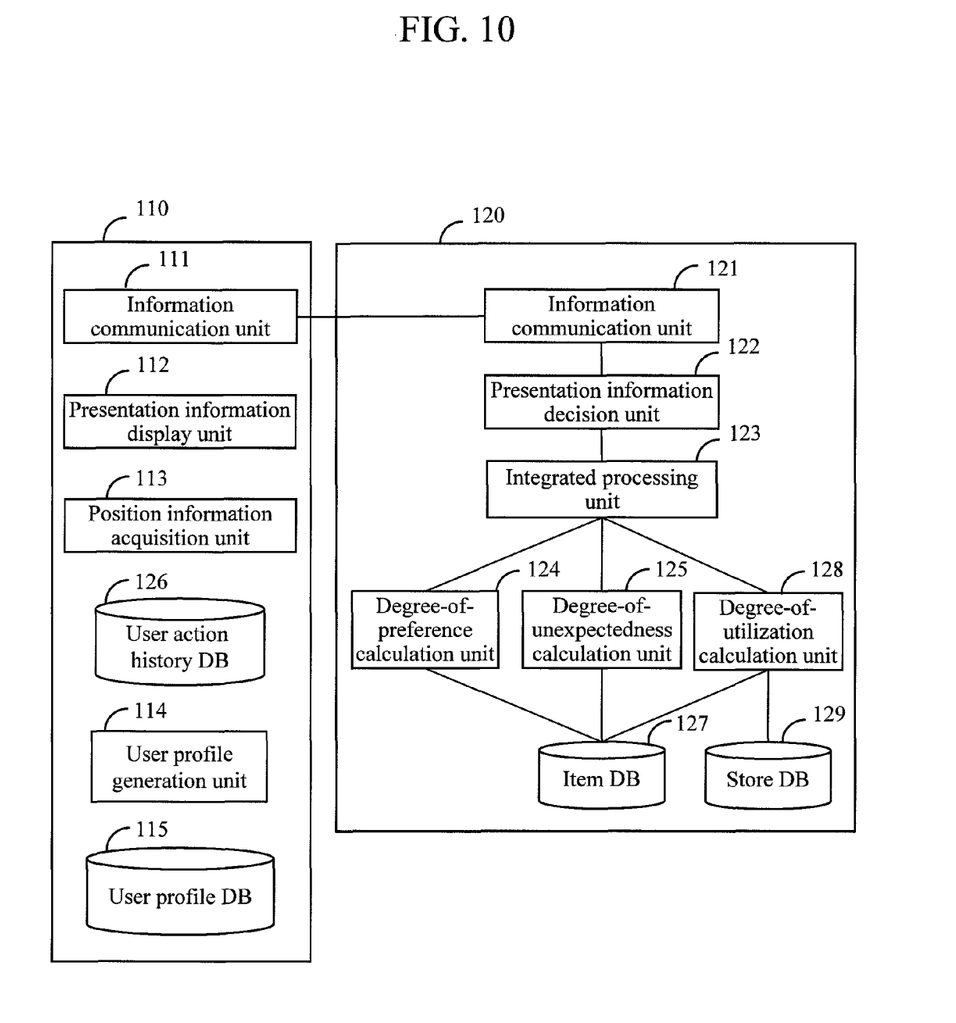
FIG. 10 is a system configuration diagram illustrating still another embodiment of the information presentation system according to the present invention.

FIG. 10 is a diagram illustrating a configuration example of an information presentation system in which part of the configuration of the information presentation system described in Embodiment 2 is changed, the user action history database 126 is moved from the server 120 to the terminal 110, and the terminal 110 is provided with a user profile generation unit 114 and a user profile database 115. The user action history database 126 is the same as that of Embodiments 1 and 2, and the user profile generation unit 114 generates the user profile database 115 from the user action history database 126. The other configuration is the same as that of Embodiment 2.

Figure 11A:
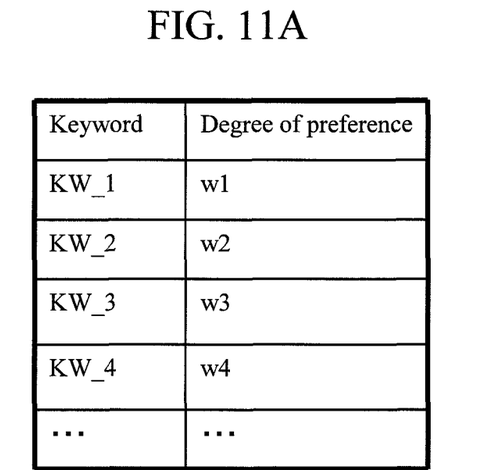
FIGS. 11A and 11B are diagrams for describing an example of a user profile database.
Figure 11B:
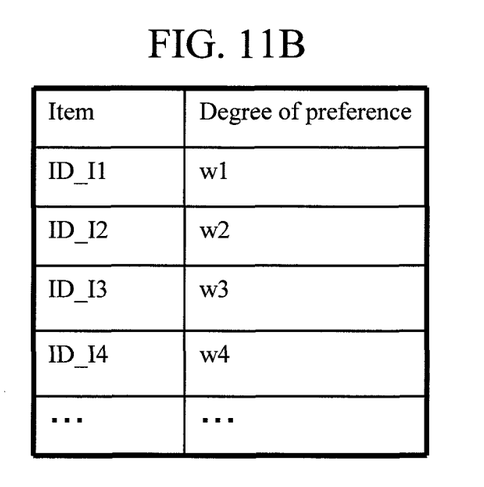

The degree of preference to a keyword which characterizes an item of the user of the terminal 110 is stored in the user profile database 115. FIG. 11A illustrates a configuration example of the user profile database 115. As illustrated in FIG. 11B, the degree of preference may be imparted to an item itself. The degree of preference may be calculated by the recommendation server, or may be inputted by the user himself/herself.

The flow of recommendation processing is the same as shown in FIG. 6. When a connection is made from the terminal 110 to the recommendation server 120 and information is transmitted via the information communication unit 111, all the keywords and the degrees of preference registered in the user profile database 115 may be transmitted, and alternatively, several keywords having a higher degree of preference are transmitted together with the degrees of preference, whereby the communication may be speeded up. The number of keywords to be transmitted may be set in advance by a service company, or may be set by the user himself/herself. In addition, when the user makes a connection to the recommendation server, the user is asked how high accuracy and response speed are needed, and the number of keywords to be transmitted may be adjusted in accordance with the result thereof.

In the case where the user profile database 115 is a database as illustrated in FIG. 11A in which the degree of preference to a keyword is stored, in Step 603 of FIG. 6, the degree of preference of each item stored in the item database 127 is calculated according to Equation (1). On the other hand, in the case where the user profile database 115 is a database as illustrated in FIG. 11B in which the degree of preference to an item is stored, Step 603 of FIG. 6 is omitted.

The invention of the present application can be applied to, for example: household video equipment such as a DVD recorder and a TV; information equipment such as a personal computer provided with a television function, a PDA, and a portable phone; and a set-top box which reproduces an Internet delivery program.

| DESCRIPTION OF SYMBOLS | |
|---|---|
| 110 | terminal |
| 111 | information communication unit |
| 112 | presentation information display unit |
| 120 | server |
| 121 | information communication unit |
| 122 | presentation information decision unit |
| 123 | integrated processing unit |
| 124 | degree-of-preference calculation unit |
| 125 | degree-of-unexpectedness calculation unit |
| 126 | user action history database |
| 127 | item database |

What is claimed is:

1. An information presentation apparatus which presents an item to a user, comprising:
at least one hardware electronic device configured to effect:
a user action history database which accumulates a history of an item used by the user;
an item database which accumulates a plurality of sets of an item and a keyword describing each item;
a degree-of-preference calculation unit which uses the user action history database and the item database, to thereby calculate a degree to which the user is interested in each item, as a degree of preference;
a degree-of-unexpectedness calculation unit which uses a reciprocal of a degree of co-occurrence between keywords accumulated in the item database, to thereby calculate a degree of unexpectedness of each item;
an integrated processing unit which processes in an integrated manner the degree of preference and the degree of unexpectedness, to thereby calculate a recommendation score of each item accumulated in the item database;
a presentation information decision unit which uses the recommendation score calculated by the integrated processing unit, to thereby decide information of an item to be presented; and
an information communication unit which performs information communication with a terminal, wherein the information of the item decided by the presentation information decision unit is transmitted from the information communication unit to the terminal.

2. The information presentation apparatus according to claim 1, wherein an information display method for the information transmitted to the terminal is changed in accordance with a type of the terminal.

3. The information presentation apparatus according to claim 1, wherein the degree-of-preference calculation unit uses the user action history database, to thereby calculate the degree of preference of each item on a basis of a degree of similarity to the used item.

4. The information presentation apparatus according to claim 1, wherein the degree-of-preference calculation unit uses a user action history database of a user other than the user, to thereby calculate the degree of preference.

5. The information presentation apparatus according to claim 1, wherein the degree-of-unexpectedness calculation unit uses the degree of preference calculated by the degree-of-preference calculation unit, to thereby reduce an amount of information to be used for calculating the degree of unexpectedness.

6. The information presentation apparatus according to claim 1, wherein the integrated processing unit includes a function of adjusting a parameter for combining the degree of preference and the degree of unexpectedness with each other.

7. The information presentation apparatus according to claim 1, wherein the integrated processing unit includes a function of learning a parameter for combining the degree of preference and the degree of unexpectedness with each other, on a basis of a ratio of the degree of preference and the degree of unexpectedness of an item selected by the user.

8. The information presentation apparatus according to claim 1, wherein the integrated processing unit includes a function of using a registration date of an item, to thereby decide a recommendation result.

9. The information presentation apparatus according to claim 1, wherein the integrated processing unit includes a function of adjusting the number of the items to be presented.

10. The information presentation apparatus according to claim 1, wherein the presentation information decision unit includes a function of deciding an amount of information in accordance with a type of the terminal.

11. The information presentation apparatus according to claim 1, further comprising:
   a store database which registers therein a store at which an item can be used; and
   a degree-of-utilization calculation unit which uses the store database and position information of the terminal received from the terminal, to thereby calculate a degree of utilization of each item.

12. The information presentation apparatus according to claim 11, wherein the degree-of-preference calculation unit uses the degree of utilization calculated by the degree-of-utilization calculation unit, to thereby reduce the number of items to be calculated.

13. The information presentation apparatus according to claim 11, wherein the degree-of-unexpectedness calculation unit uses the degree of utilization calculated by the degree-of-utilization calculation unit, to thereby reduce the number of items to be calculated.

14. The information presentation apparatus according to claim 11, wherein the integrated processing unit includes a method of adjusting a parameter for combining the degree of utilization, the degree of unexpectedness, and the degree of preference with one another.

15. The information presentation apparatus according to claim 11, wherein the integrated processing unit includes a function of learning a parameter for combining the degree of utilization, the degree of unexpectedness, and the degree of preference with one another, on a basis of a ratio of the degree of utilization, the degree of unexpectedness, and the degree of preference of an item selected by the user.

16. The information presentation apparatus according to claim 1, further comprising a data update unit which updates data of the item database.

17. The information presentation apparatus according to claim 16, wherein the data update unit includes a method of reducing an amount of data on a basis of the degree of unexpectedness and the degree of preference.

18. The information presentation apparatus according to claim 1, further comprising:
   a user profile generation unit which generates a profile of the user; and
   a user profile database which manages the profile of the user.

* * * * *